United States Patent [19]
Hartmann

[11] Patent Number: 5,351,907
[45] Date of Patent: Oct. 4, 1994

[54] COILING DEVICE FOR CORDAGE MATERIAL

[76] Inventor: Horst Hartmann, Kemmathen 44, W-8551 Hiltpoltstein, Fed. Rep. of Germany

[21] Appl. No.: 894,711

[22] Filed: Jun. 5, 1992

[30] Foreign Application Priority Data

Jun. 7, 1991 [DE] Fed. Rep. of Germany ... 9107008[U]
Oct. 9, 1991 [DE] Fed. Rep. of Germany ... 9112546[U]

[51] Int. Cl.$^5$ .......................................... B65H 75/38
[52] U.S. Cl. ................. 242/388.1; 242/396.6
[58] Field of Search .............. 242/85, 85.1, 86, 86.1, 242/96, 100.1, 110.1, 77; 24/71.2

[56] References Cited

U.S. PATENT DOCUMENTS

| | | | |
|---|---|---|---|
| 2,351,379 | 6/1944 | Wehringer | 242/85.1 |
| 2,364,262 | 12/1944 | Wehringer | 242/85.1 |
| 2,587,707 | 3/1952 | Deuer | 242/85.1 |
| 2,865,071 | 12/1958 | Clemens | 24/71.2 |
| 2,991,523 | 7/1961 | Del Conte | 24/71.2 |
| 3,208,121 | 9/1965 | Price | 242/100.1 |
| 3,809,331 | 5/1974 | Gaul | 242/100.1 |
| 4,061,290 | 12/1977 | Harrill | 242/96 |
| 4,200,249 | 4/1980 | Synstelier et al. | 242/96 |
| 4,244,536 | 1/1981 | Harrill | 242/96 |
| 4,282,954 | 8/1981 | Hill | 242/96 X |
| 4,306,688 | 12/1981 | Hechler, IV | 242/86 |
| 4,322,045 | 3/1982 | Tellier | 242/86.1 |
| 4,416,429 | 11/1983 | Jessamine | 242/86.1 |
| 4,466,581 | 8/1984 | Hill | 242/96 |
| 4,653,833 | 3/1987 | Czubernat et al. | 242/96 X |
| 4,802,638 | 2/1989 | Burger et al. | 242/100.1 X |
| 4,844,373 | 7/1989 | Fike, Sr. | 242/85 X |
| 5,074,074 | 12/1991 | Yeadon | 242/96 X |

FOREIGN PATENT DOCUMENTS

| | | | |
|---|---|---|---|
| 654722 | 12/1962 | Canada | 242/85.1 |
| 2305292 | 8/1974 | Fed. Rep. of Germany | 242/100.1 |
| 0180883 | 10/1985 | Fed. Rep. of Germany . | |
| 3600213 | 7/1987 | Fed. Rep. of Germany | 242/85 |
| 60-223289 | 11/1985 | Japan | 242/85 |
| 62-100380 | 5/1987 | Japan | 242/77 |
| 2156781 | 10/1985 | United Kingdom | 242/77 |
| 2164631 | 3/1986 | United Kingdom | 242/86 |
| WO90/01821 | 2/1990 | World Int. Prop. O. | 242/77 |

*Primary Examiner*—Daniel P. Stodola
*Assistant Examiner*—John P. Darling
*Attorney, Agent, or Firm*—Spencer, Frank & Schneider

[57] ABSTRACT

A coiling device for cordage material, having a housing assembled from two half-housing shells, and having a coiling shaft rotatably supported in the housing. The coiling shaft is formed of two half shafts and the two half shafts are insertable from two different sides into the already assembled housing and can be locked to one another form-fittingly, such that the coiling shaft braces the two half housing shells in the finally assembled state.

17 Claims, 15 Drawing Sheets

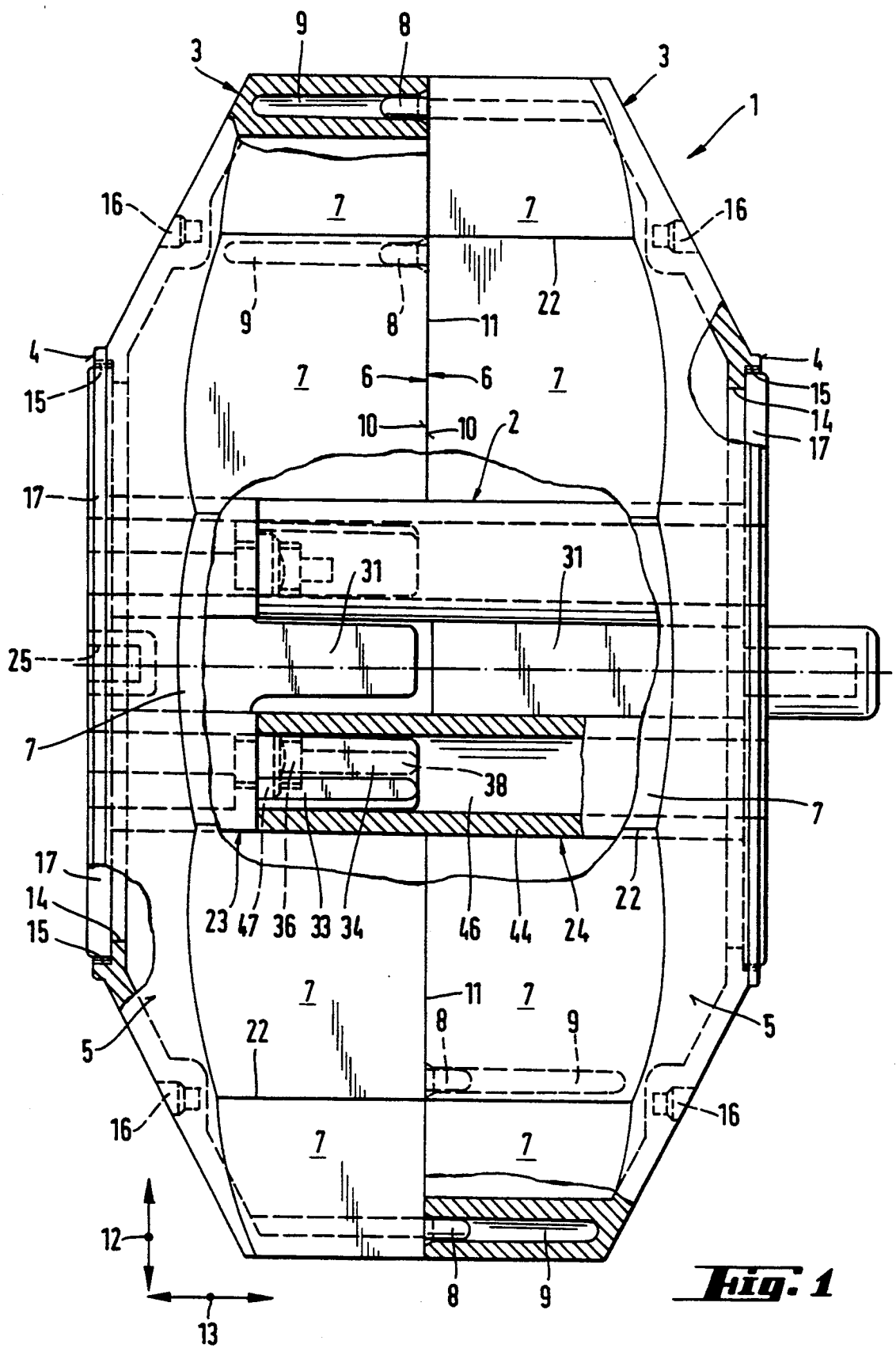

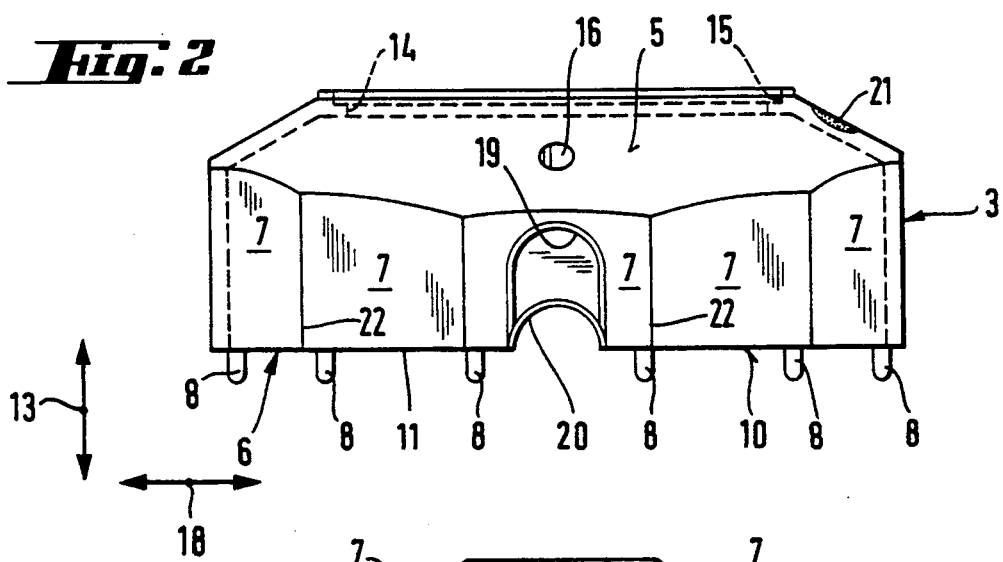
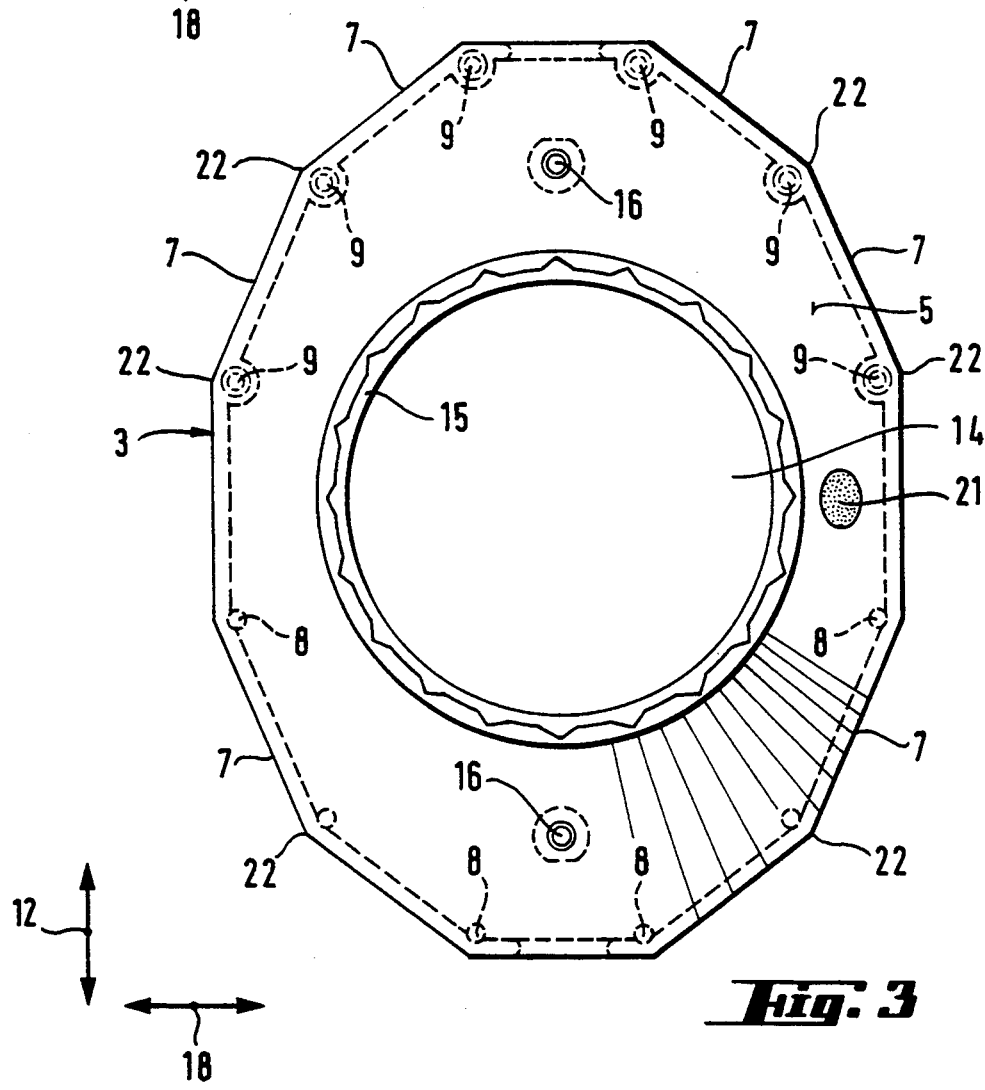

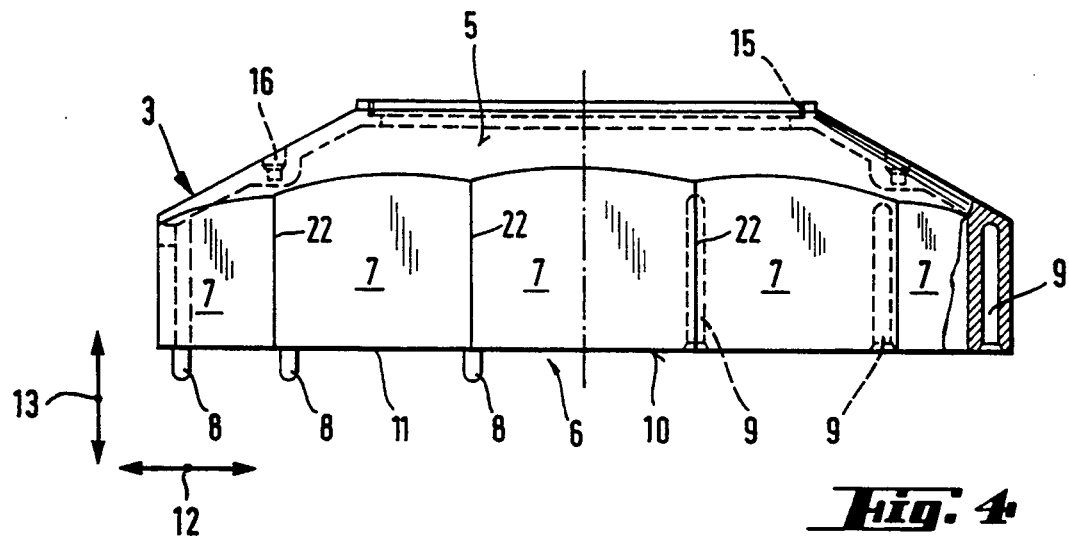
_Fig. 4_
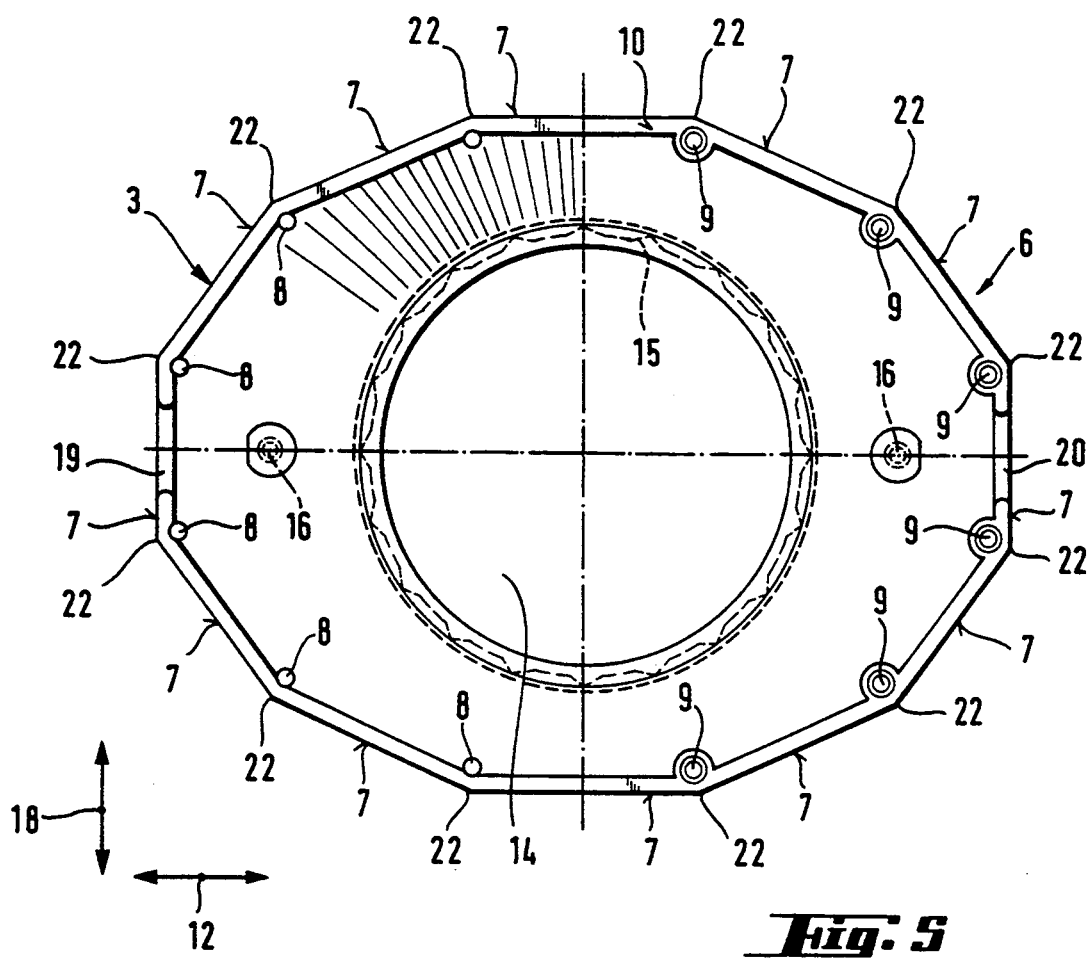
_Fig. 5_

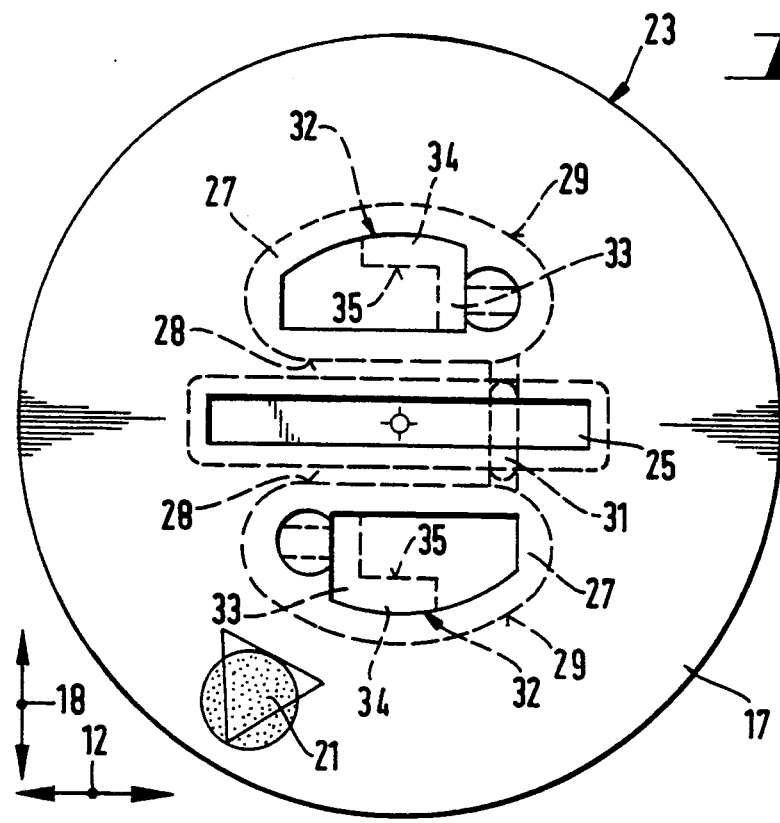
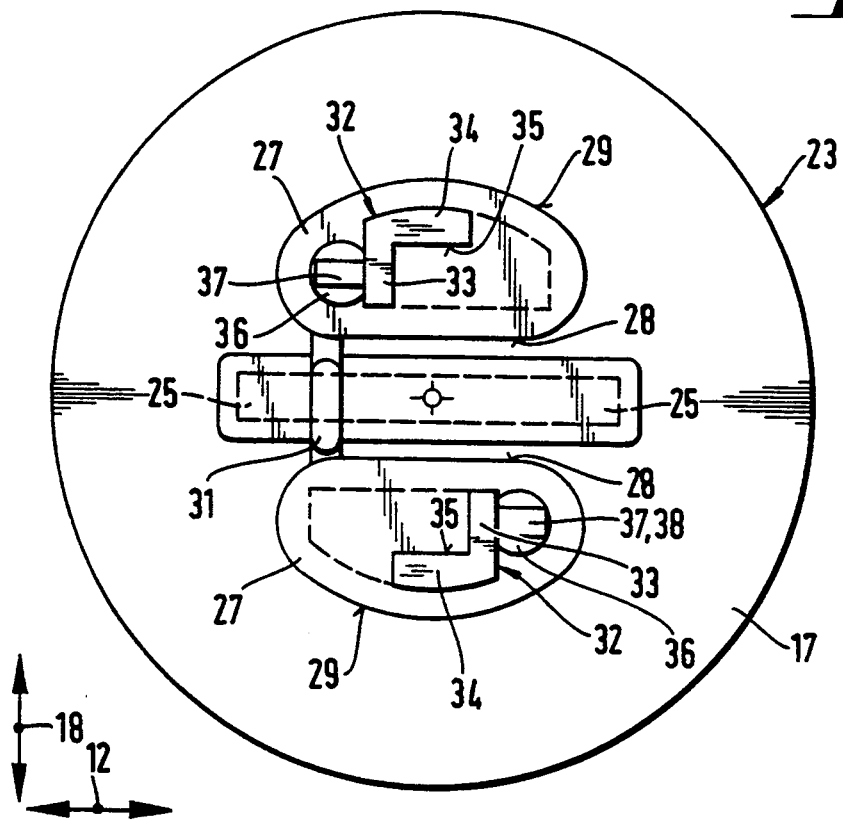

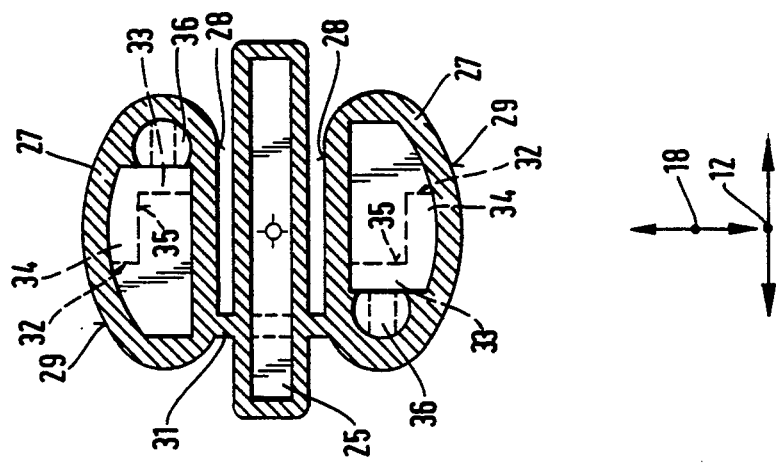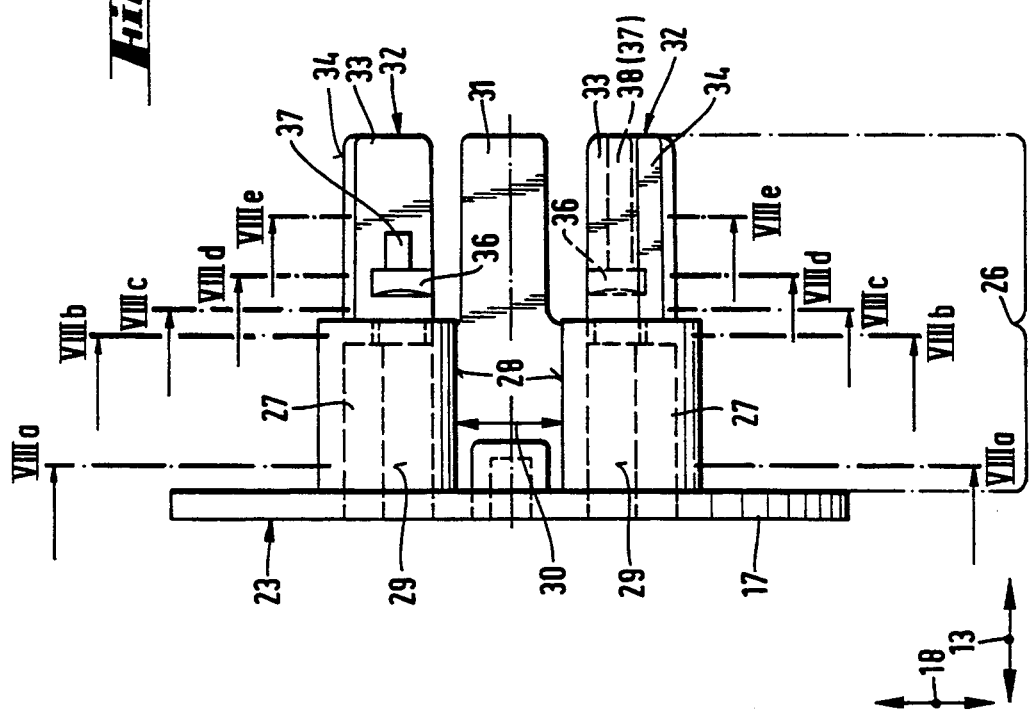

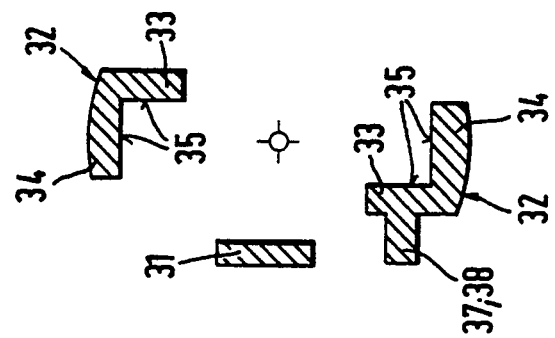
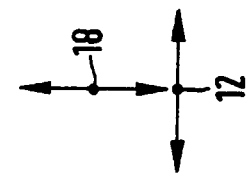
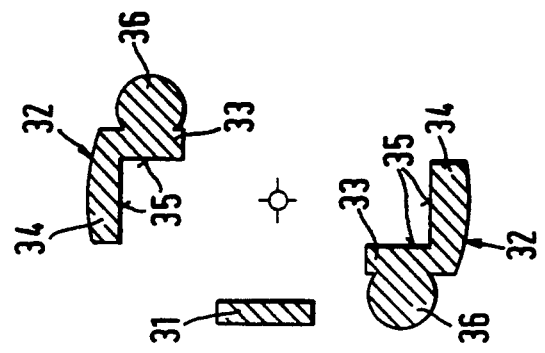
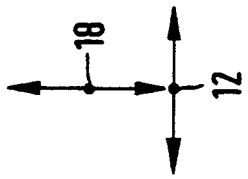
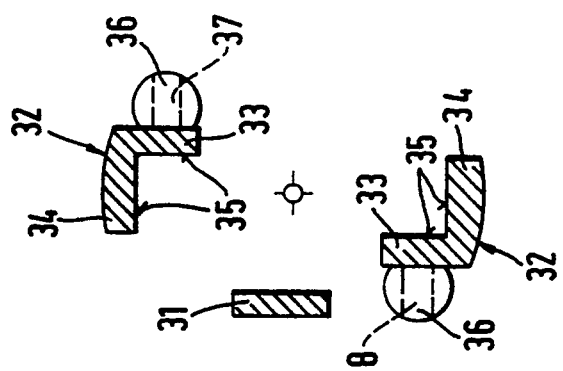
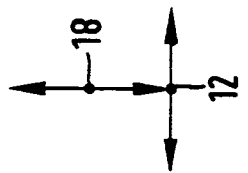
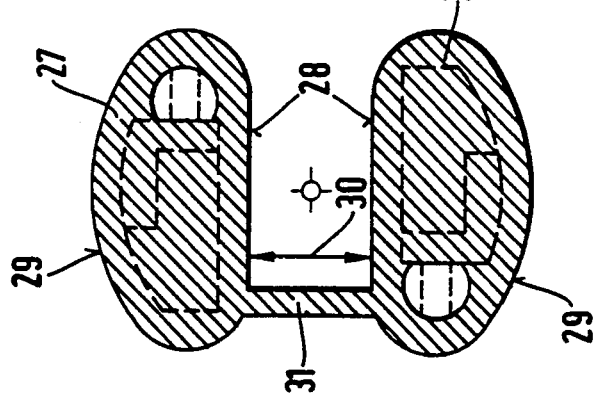
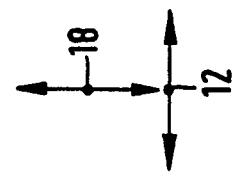

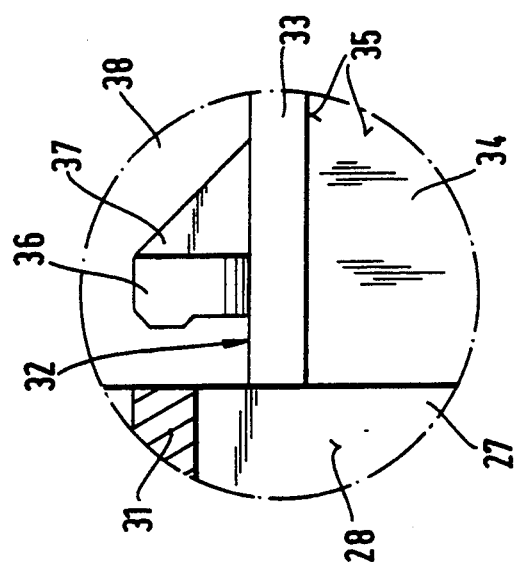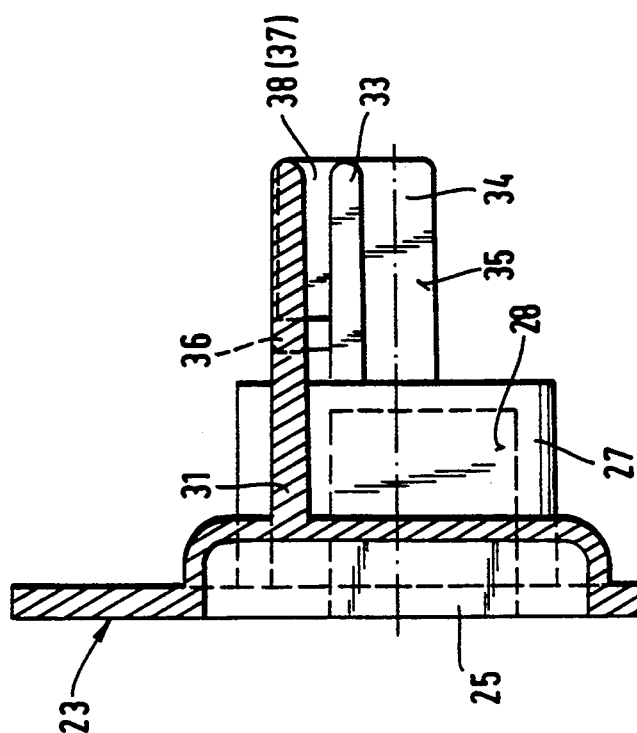

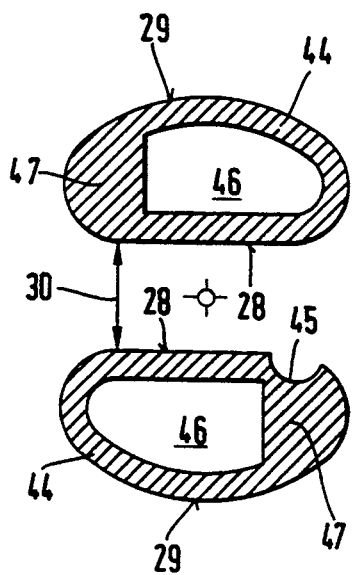
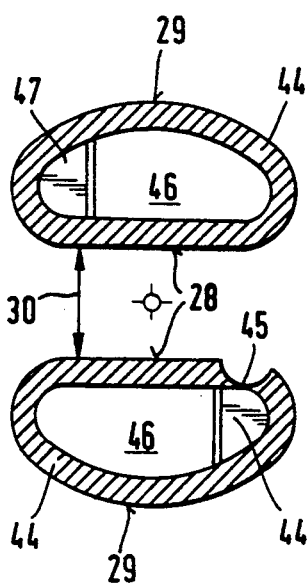
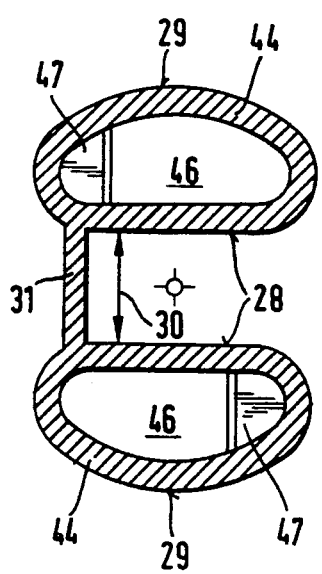
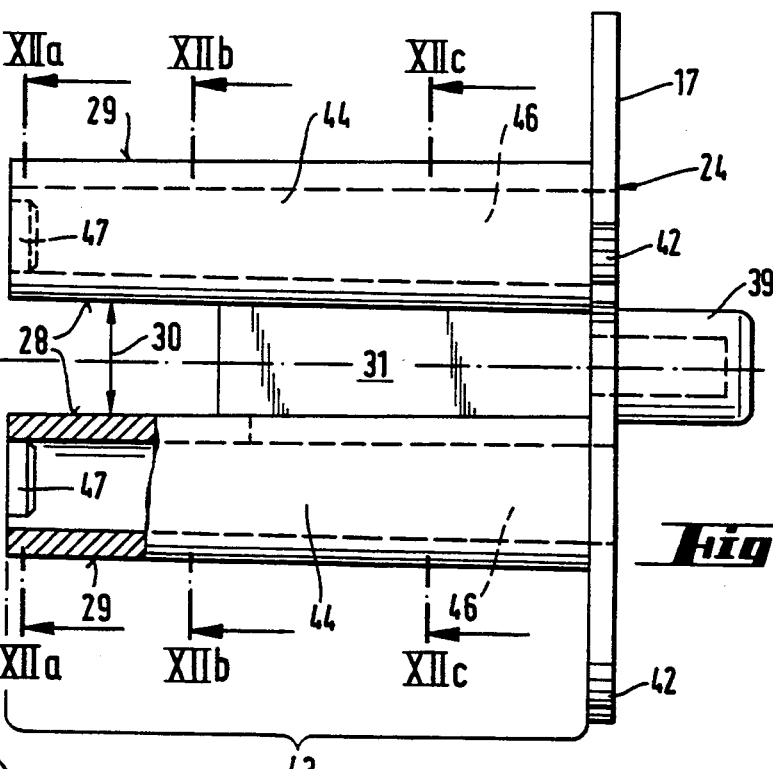

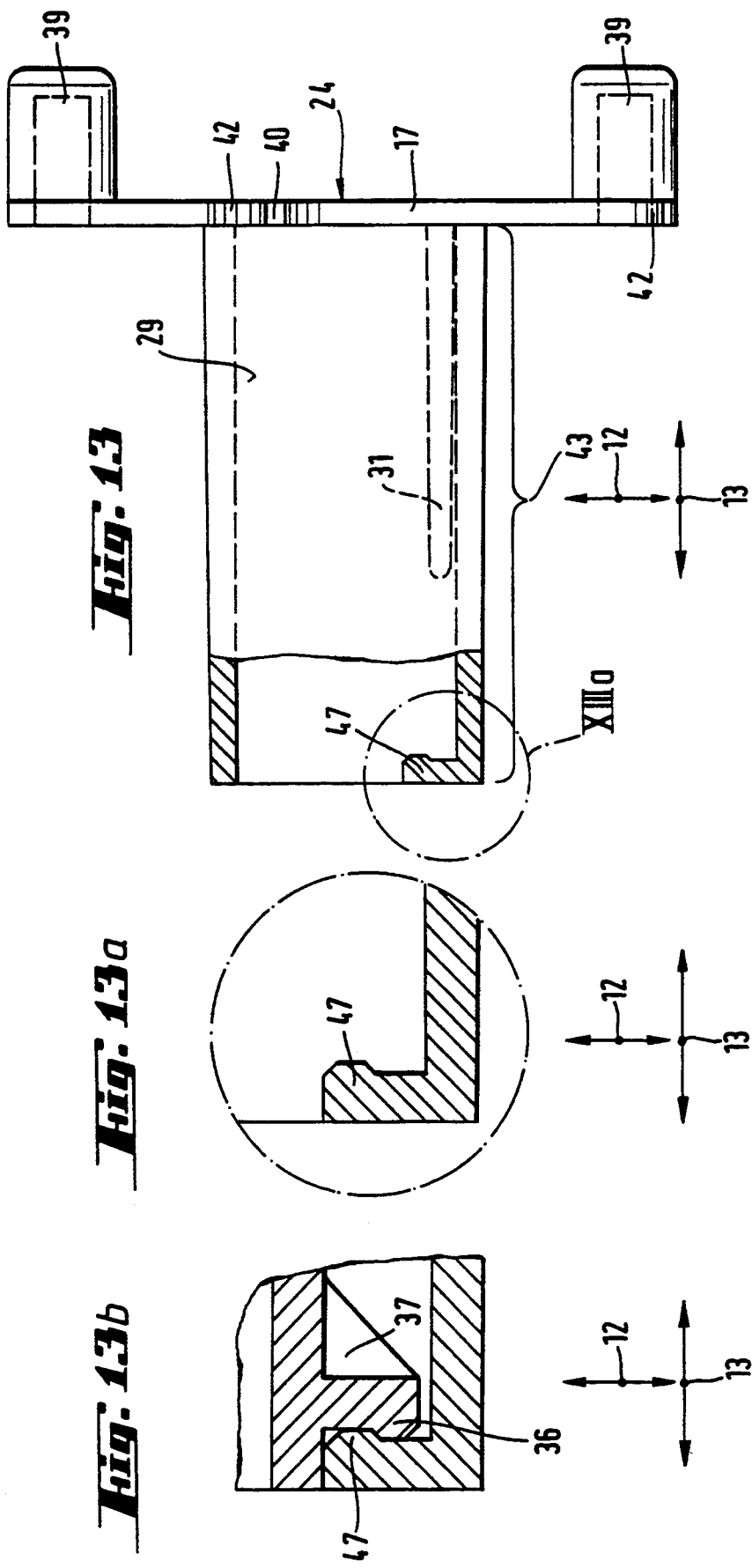

COILING DEVICE FOR CORDAGE MATERIAL

CROSS REFERENCE TO RELATED APPLICATION

This application claims the priority of U.S. patent application Ser. Nos. G 91/07008, filed Jun. 7, 1991, and G 91/12546, filed Oct. 9, 1991, in the Federal Republic of Germany, the subject matter of which is incorporated herein by reference.

BACKGROUND OF THE INVENTION

The invention relates to a coiling device for a cord or other cordage material, and more particularly to a coiling device of the type having a housing that can be put together from two half housing shells and having a coiling shaft that is rotatably supported in the housing.

With cordage material, there is often the problem that the desired, prescribed length deviates from the existing actual length of the cordage material. The term "cordage material" may refer to any conceivable forms of cordage material, in particular yarn, rope, lines, cords, electric cables, cables in general, hoses, and so forth, made of any conceivable material. Electric cables in particular, have the familiar problem that the actual length may differ from the prescribed length. For instance, the length of connecting cables between telephone handsets and the associated wall jacks is standardized. The length of connection cables for computer peripherals or stereo systems is also standardized. If the entire standardized length is not needed for connecting the peripheral, then the cable usually simply lies around, rolled up in a more or less orderly way. Especially with central control units such as the central processing unit of a personal computer or the tuner of a stereo system, a number of different cables must often be connected. These are usually too long and are simply stuffed behind the unit. The cables usually become entangled with one another, making a so-called "cable salad" behind the unit. If one line has to be removed or replaced afterward, then all the cables have to be untangled first, and the right cable has to be looked for. This is not only very time-consuming but also often requires great patience.

Even with only temporarily set-up equipment, the actual length of the power and control cables often differs from the required prescribed length. This can lead in turn to the aforementioned disorder among the various cables. There is also the danger that innocent passersby may trip on overly long cables that are lying around and may injure themselves seriously. Aside from possible damage to the interconnected technical equipment, this snarelike effect also entails the risk of injury to the person who trips, as well as a liability risk for the system operator.

For shortening the cordage material from its actual length to a desired prescribed length, a coiling device for cordage material is known from EP 180 883. In this coiler, a rotatable coiling shaft is rotatably supported between the ends of a housing drum. The coiling shaft is provided with a restoring spring that drives it to rotate and that acts with its spring force upon the coiling shaft. Because of the spring force acting upon the coiling shaft, the coiling shaft rotates and coils the cordage material up on itself. One disadvantage of this device is its complex assembly. The cordage material first has to be threaded onto the coiling shaft, and in a further operation, the housing has to be firmly closed in a complicated way.

U.S. Pat. No. 2,865,071 discloses another winding device, in which the winding shaft is molded onto a housing part. The winding shaft comprises two spring arms and forms a snap closure with a further housing drum that can be slipped onto it. With this device as well, the cordage material must first be threaded into the winding shaft, and the entering or leaving cord must be threaded into the associated openings of the housing drum, before the housing drum can be securely locked into place. There is also the danger in this device that the resultant cordage winding may not distribute itself uniformly over the entire axial length of the winding shaft, but that instead a cord winding of large diameter may form very rapidly at one point, so that the full holding capacity of the device cannot be used.

SUMMARY OF THE INVENTION

To overcome these disadvantages, it is the object of the invention to create an easily installed coiling device with improved coiling performance.

To this end, the coiling device according to the invention comprises a housing and a coiling shaft rotatably supported in the housing. The coiling shaft in turn comprises two half shafts, which can be form-fittingly locked together. The housing comprises two half housing shells, which can be put together without prior insertion of the coiling shaft. The two half shafts can be inserted from the outside into the completely assembled housing. The half shafts, locked form-fittingly together in the finally assembled state, also effect the overall permanent holding together of the housing. Consequently, the device needs no fastening elements for the two half housing shells. It can be appreciated that this makes the housing simple to assemble. For assembly, the cord is first brought inside the housing by the assembly of the two half housing shells. The cord, already resting within the completely assembled housing, is in a sense self-mounting as the half shells are inserted. It is especially advantageous that the components of the device that have already been fully assembled can be held with one hand while the as yet missing components can be inserted into the device with the other, free hand.

The use of two structurally identical half housing shells, which can be installed in mirror-inverted fashion, is advantageous from a production standpoint because only one type of housing shell needs to be manufactured. Moreover, only this one type of housing shell needs to be kept on hand, which lowers inventory costs and distribution expenses. The housing shells may have a bowl-like shape, so that a roomy coiling chamber adapted to the shape of the cordage winding on the coiling shaft is created.

The housing may have plane side walls which permit particularly solid support of the coiling shaft and are favorable for post-machining of the bearing eyes for the coiling shaft. Each housing shell may have a bowl rim with twelve plane faces, a plane bowl bottom and a curving bowl wall. Such an arrangement makes for especially simple manufacture of the half housing shells as injected plastic parts. The thus-shaped plastic parts can easily be unmolded from the nests of a plastic injection molding machine. Moreover, the plane faces mean that the device does not tend to roll away but instead stays stably resting at its intended place.

Centering elements may be employed to make it easier to put the housing together and subsequently to introduce the half shafts. The two half housing shells are already so well centered on one another here that the entire housing can be moved back and forth, without any need to fear that the housing will immediately fall apart.

Two openings, with opening cross sections of different sizes, may be provided on opposing regions of the rims of the half housing shells in the region of the resultant parting line. Such an arrangement means that the cordage material runs obliquely into the coiling chamber relative to the parting line between the half housing shells. Because of this oblique entry direction into the coiling chamber, the cordage material will also tend to wind obliquely onto the coiling shaft, producing a uniform distribution of the resultant cordage winding over the entire axial length of the coiling shaft.

The two half shafts comprise shaft elements that form the actual coiling shaft and that each have one disk, in the manner of a flange, on one shaft end each. These disks have a diameter slightly larger than the bearing eyes. The disk rim protruding past the bearing eyes supports the disks axially against the bearing eyes and thus prevents the coiling shaft from slipping through one of the bearing eyes. In this way the disks are effective as axial bearings of the coiling shaft in the housing. Because of the open track guidance for the disks in the bearing eyes, resulting from an offset bend in the peripheral region, the disks are especially well-aligned with the housing and can be rotated easily and precisely. Disks that are split at a tangent to form spring arms with braking jaws at the free ends may be used to control the rotatability of the coiling shaft in such a way that the coiling shaft can be kept stable in any given prescribed position.

For locking the two half shafts together, one half shaft is embodied as a key-type half shaft, and the other is embodied as a lock-type half shaft. The key half has detent elements, and the lock half has receiving elements, so that the detent elements cooperate with the receiving elements by the "lock and key principle". To lock the two half shafts, the invention advantageously uses a bayonet mount, with the aid of which the coiling shaft can be easily assembled and disassembled even several times. Detent protrusions are preferably provided on the key half and locking hooks are preferably provided on the lock half perform the actual function of the bayonet mount. Rails furthermore may be provided on the key half and track guides may be provided on the lock half to serve on the one hand as fastening devices for the detent protrusions and locking hooks and on the other hand to form a sliding guide with one another, which additionally facilitates sliding the key half into the lock half and thus assembling the coiling shaft. The rails may be L-shaped which makes it possible to give each leg of the L its own function. One leg of the L is embodied as a bearing leg for a detent protrusion, while the other leg of the L is a guide leg, with a shaft adapted to the hollow cross section of the associated track guide. A support rib may be employed to effect solid support of the associated detent protrusion and to assure a defined position of the key half upon insertion into the lock half. A guide groove formed on the lock half, and a sword-like strip on the key half may be provided to make the key half insertable into the lock half only in a defined rotational position. As a result, the relative insertion position of the two halves to one another as they are inserted is always assured. A hollow conduit may be provided inside the completely assembled coiling shaft. Some of the cord is guided through this hollow conduit for fixation to the coiling shaft. This guidance through the hollow conduit reinforces the effect of the oblique course of the cord in the coiling chamber. The course of the cord is made still more oblique by the guidance through the hollow conduit, which additionally promotes the uniform winding of the cord over the axial length of the coiling shaft.

A handle bracket may be provided on the housing and colored markings may be used on the outsides of both half housing shells and on both of the disks peripherally defining the coiling shafts, to facilitate the assembly of the coiling device.

Turning knobs may be provided on the outside of the disks, as actuating elements for the coiling shaft. Furthermore slots may be provided to receive coins or similar aids in assembly for turning the half shafts relative to one another as the bayonet mount is opened or closed.

BRIEF DESCRIPTION OF THE DRAWINGS

The invention is described further in terms of the following exemplary embodiment, shown in the drawings. Shown are:

FIG. 1, a plan view, partly in section, of the completely assembled device;

FIG. 2, a side view of the short side of one half housing shell;

FIG. 3, a plan view of the outside of a half housing shell;

FIG. 4, a side view of the long side of a half housing shell;

FIG. 5, a view of the inside of a half housing shell,

FIG. 6, a plan view of the outside of the disk of the key half;

FIG. 7, a plan view of the inside of the disk of the key half;

FIG. 8, a side view of the key half;

FIG. 9, a side of the key half, rotated by 90° from FIG. 8;

FIG. 9a, a detail view of a detent protrusion;

FIG. 12, a side view of the lock half;

FIGS. 12a–12c, sectional views taken along lines XIIa–XIIa through XIIc–XIIc of FIG. 12;

FIG. 13, a side of the lock half, rotated by 90° from FIG. 12;

FIG. 13a, a detail view of a locking hook;

FIG. 13b, a detail view of the locking hook with the detent protrusion locked into place;

DETAILED DESCRIPTION OF THE PREFERRED EMBODIMENT

Figure 10:
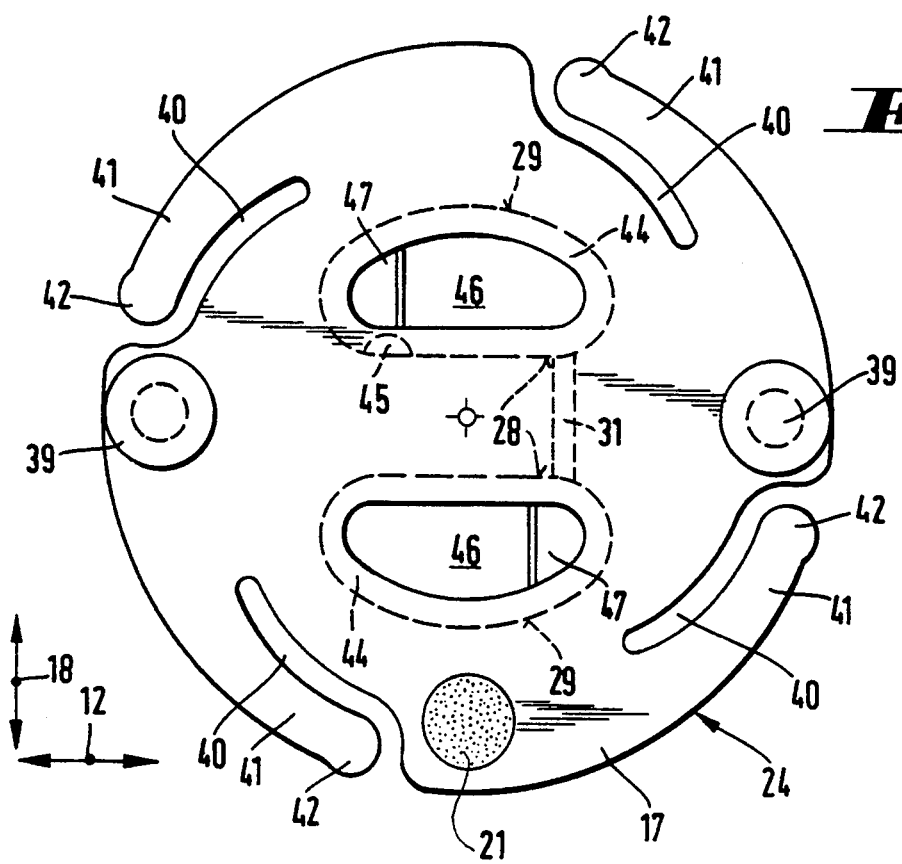
FIG. 10, a plan view of the outside of the disk of the lock half.

The device of the invention, shown in FIG. 1, substantially comprises a housing 1 and a coiling shaft 2. The housing 1 in turn is assembled from half housing shells 3. The half housing shells 3 are bowl-shaped, and each has a flat bowl bottom 4 and a curving bowl wall 5. Bowl rims 6, which are formed by a total of twelve plane faces 7 per half housing shell 3, extend substantially at right angles to the bowl bottoms 4. For centering the half housing shells 3 on one another, centering pins 8 project from the bowl rims 6 and protrude into corresponding centering bores 9 of each respective other half housing shell 3.

The half housing shells 3 rest with the face ends 10 of their bowl rims 6 on one another and between them form a parting line 11. The parting line 11 extends along the long side of the housing 1 in the longitudinal parting line direction 12. The axial direction 13 extends at right angles to the longitudinal parting line direction 12, and the longitudinal parting line direction 12 and the axial direction 13 define the plane of the drawing of FIG. 1.

Bearing eyes 14 for rotational support of the coiling shaft 2 are recessed out of the bowl bottoms 4. The peripheral regions 15 of the bearing eyes 14 are bent at an offset in such a way that they form a track guide for the corresponding bearing elements of the coiling shaft 2. Blind bores 16 for mounting a handle bracket are also drilled into the outside of the housing 1.

The coiling shaft 2 extends in the axial direction 13 and is suggested in dashed lines in FIG. 1. The coiling shaft 2 is rotatably supported with circular disks 17 on its shaft ends in the peripheral regions 15 of the bearing eyes 14. The plane of the drawing in FIG. 2 is defined by the axial direction 13 and the transverse parting line direction 18. The transverse parting line direction 18 extends at right angles to the axial direction 13 and at right angles to the longitudinal parting line direction 12. In FIG. 2, an entry opening 19, broken through of a plane face, and an exit opening 20 opposite the entry opening 19 in the longitudinal parting line direction 12 are shown. The inside cross section of the entry opening 19 can be seen to be markedly greater than the inside cross section of the exit opening 20.

The plane of the drawing in FIG. 3 is defined by the longitudinal parting line direction 12 and the transverse parting line direction 18. In the plan view shown in FIG. 3 of the half housing shell 3, the twelve-sided cross-sectional shape of the half housing shell 3 is shown, with the twelve plane faces 7. FIG. 3 also shows a plan view of the peripheral regions 15, which are the track guides for the disks 17 once the coiling shaft 2 is installed. A marking 21 which serves as an aid in assembly is provided on the outside of the half housing shell 3.

FIG. 4 shows a side view of the half housing shell 3, rotated by 90° from FIG. 2 about an axis extending in the axial direction 13, so that the axial direction 13 and the longitudinal parting line direction 12 define the plane of the drawing of FIG. 4. The plan view in FIG. 5 of the inside of the half housing shell 3 and FIG. 4 show that in each case in half of the drawing, centering pins 8 and centering bores 9 as receptacles for the centering pins 8 are respectively provided in the edge regions 22 formed by the plane faces 7. Because of this arrangement of the centering pins 8 and centering bores 9, it is possible to assemble two structurally identical half housing shells 3 in mirror inversion with respect to the parting line 11 and the coiling shaft 2. As shown in FIG. 1, the centering pins 8 of one half housing shell 3 engage the corresponding centering bores of the other half housing shell 3 once the housing 1 is completely assembled.

The coiling shaft 2, shown in the completely assembled state in FIG. 1, comprises a key half shaft 23 and a lock half shaft 24. FIG. 6 shows the outside of the disk 17 of the key half 23. A coin slot 25 is machined into the outside of the disk 17 of the key half 23, as an aid in assembly. A marking 21 is provided as an aid in assembly on the outside of the disk 17 of the key half 23.

FIG. 7 shows a plan view on the inside of the key half 23 with detent elements. The detent elements of the key half 23 will now be explained in conjunction with FIGS. 7 and 8.

The key half 23 comprises a key half region 26 itself, and the disk 17 attached to one shaft end in the manner of a flange. The key half region 26 extends in the axial direction 13. Spacer elements 27 are provided in the axial direction 13 next to the disk 17. As shown in FIGS. 8a and 8b, each of the spacer elements 27 have a flat-oval outline; the flat sides 28 of the spacer elements 27 are oriented toward one another. The outer rounded sides 29 remote from the flat sides 28 form a coiling surface for the cordage material. The flat sides 28 of the spacer elements 27 are spaced apart in such a way that between them they form a fixation slot 30 for the cordage material to be coiled. The fixation slot 30 is defined on one peripheral side by a sword-like strip 31. The strip 31 joins the two spacer elements 27 to one another and extends in the axial direction 13.

The spacer elements 27 are adjoined in the axial direction 13 by L-shaped rails 32. The L-shaped rails 32 comprise a support leg 33 and the guide leg 34 (see FIGS. 8c, 8d and 8e). The rails 32 are point-symmetrically arranged with respect to one another, and a point of symmetry is located on the longitudinal center axis, extending in the axial direction 13, of the coiling shaft 2. The rails 32 are disposed on the key half 23 in such a way that their inner rail sides 35 face one another. At some distance in the axial direction 13 from the spacer elements 27, both rails 32 have detent protrusions 36, on the outsides of the support legs 33 remote from the inner rail sides 35. The detent protrusions 36 are supported by supports 37 extending in the axial direction 13. One support 37 is formed by a support rib 38, which projects at right angles from the outside of the support leg 33 remote from the inner rail side 35. The support rib 38 extends in the axial direction 13 from the detent protrusion 36 as far as the end of the key half 23 remote from the disk 17.

FIG. 9a shows the support 37 with its triangular cross section. The legs forming the right angle of the triangle form the support leg 33 and the detent protrusion 36, which are joined to one another by the hypotenuse.

FIG. 10 shows a plan view of the outside of the disk 17 of the lock half 24. Turning knobs 39 for driving the coiling shaft 2 rotationally protrude outward from the outside of the disk 17 of the lock half 24 in the axial direction 13. A marking 21 is also provided on the outside of the disk 17 of the lock half 24. The disk 17 of the lock half 24 is slit with radial slits 40. The radial slits 40 are flanked on their inside by the disk 17 and on their outside by spring arms 41. The spring arms 41 have braking jaws 42 on their free ends. In the finally assembled state, the braking jaws 42 rest on the peripheral regions 15 of the bearing eyes 14 and make the coiling shaft 2 more difficult to rotate, to assure that a preset rotary position of the shaft is maintained.

Figure 11:
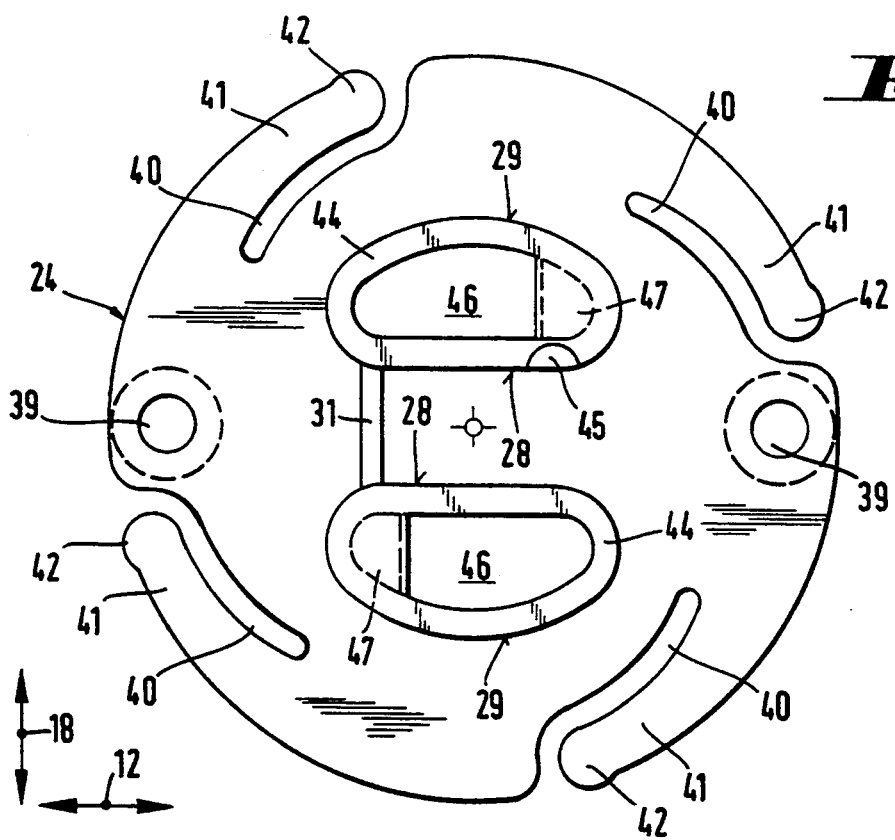
FIG. 11, a plan view of the inside of the disk of the lock half.

FIG. 11 shows a plan view of the inside of the disk 17 of the lock half 24. The structure of the lock half 24 will now be described in conjunction with FIGS. 11 and 12:

The lock half 24—like the key half 23—comprises a lock half region 43 extending in the axial direction 13. Two closed track guides 44 project in forklike fashion from the disk 17 in the axial direction 13. The outer wall cross sections of the track guides 44 correspond to the shape of the spacer elements 27. The outer wall cross sections of the track guides 44 are correspondingly flat-oval in shape, and the track guides 44 are also disposed with their flat sides 28 facing one another. As do the spacer elements 27, the track guides 44 form a fixation slot 30 between their flat sides 28 for the cordage material. Similarly to the spacer elements 27, the track guides 44 are also joined together by a strip 31 that peripherally closes off the fixation slot 30. The outer rounded sides 29 of the track guides 44, remote from the flat sides 28, also serve as a surface onto which the cordage material can be coiled.

In a distinction from the spacer elements 27, a guide groove 45 is molded into the flat side 28 of a track guide 44. The guide groove 45 does not extend over the entire length of the lock half region 43 in the axial direction 13, however.

The track guides 44 have a flat-oval hollow cross section 46. In the region of the shaft end remote from the disk 17, the hollow cross section 46 of the track guides 44 is partly closed by locking hooks 47, embodied as plate elements. The track guides are point-symmetrically arranged with respect to one another, so that in the transverse parting line direction 18 the locking hooks 47 point in various directions.

FIG. 12a shows the shaft end remote from the disk 17 of the lock half 24 with the locking hooks 47. FIG. 12b shows the flat-oval inside hollow cross section 46. As in FIG. 12a, the flat side 28 of one track guide 44, in the drawing the lower one, also has the guide groove 45. FIG. 12c shows the region of the lock half 24 adjacent the disk 17. Here, the guide groove 45 is not present on the flat side 28. In the region shown in FIG. 12c, the strip 31 joining the flat sides 28 of the track guides 44 can be seen. Compared with the view of FIG. 12, the lock half 24 in the view of FIG. 13 is rotated by 90° about its longitudinal center axis extending in the axial direction 13. In the view of FIG. 13, the locking hook 47 is particularly apparent. The locking hook 47 is shown again in FIG. 13a on a larger scale. The view of FIG. 13b shows the locking hook 47 and the detent protrusion 36 in their locking position. The locking hook 47 engages the detent protrusion 36 form-fittingly from behind, which controverts the mutual displaceability of the key half 23 and lock half 24 in the axial direction 13.

The assembly of the device proceeds as follows:

1. One of the half housing shells 3 is picked up, preferably in the left hand. With the right hand, a length, pulled taut, of the cordage material to be coiled is placed in the half housing shell 3 in such a way that it rests both in the entry opening 19 and in the exit opening 20. The half housing shell 3 and the cord are held firmly with the left hand.

2. With the right hand, the second half housing shell 3 is placed in mirror inversion on the half housing shell 3 held in the left hand, in such a way that the centering pins 8 of one half housing shell 3 slide into the corresponding centering bores 9 of the other half housing shell 3. The thus completely assembled housing is now firmly held in the left hand.

3. The lock half 24, with its track guides 44 protruding in forked fashion, is inserted with the right hand into the housing through a bearing eye 14. The disk 17 of the lock half 24 is rotated into the position in which one marking 21 on the outside of the housing 1 in the transverse parting line direction 18 is located on a straight line with the marking 21 on the outside of the disk 17 of the lock half 24. In this functional position, it is assured that the flat sides 28 of the track guides 44 are oriented in the longitudinal parting line direction 2, so that the track guides 44 flank the cord extending between the entry opening 19 and the exit opening 20.

Figure 16:
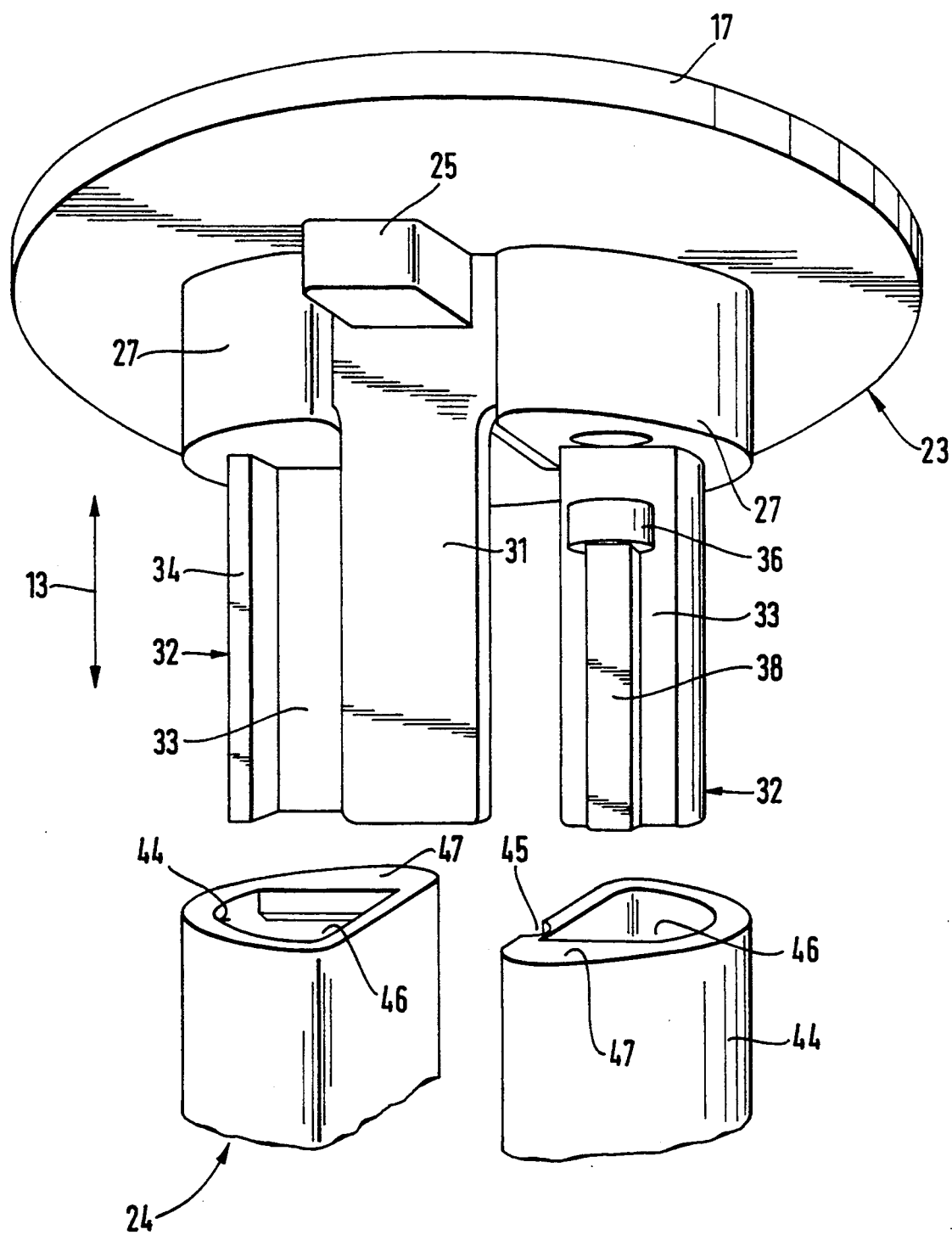
FIG. 16, a perspective view of the key half and lock half, shown in fragmentary form, prior to the insertion.
Figure 17:
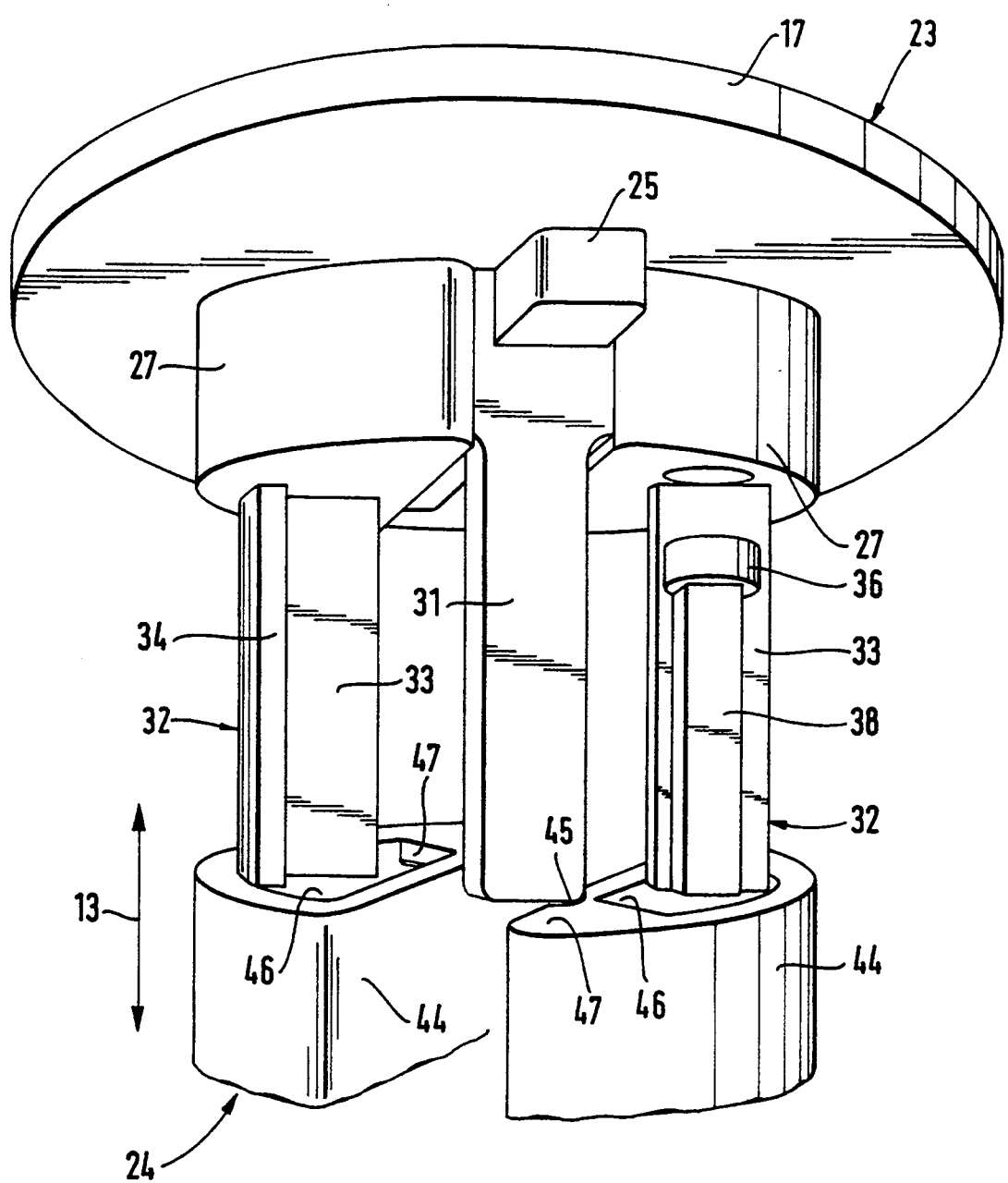
FIG. 17, a perspective view of the key half and lock half, shown in fragmentary form, at the beginning of the insertion process.
Figure 18:
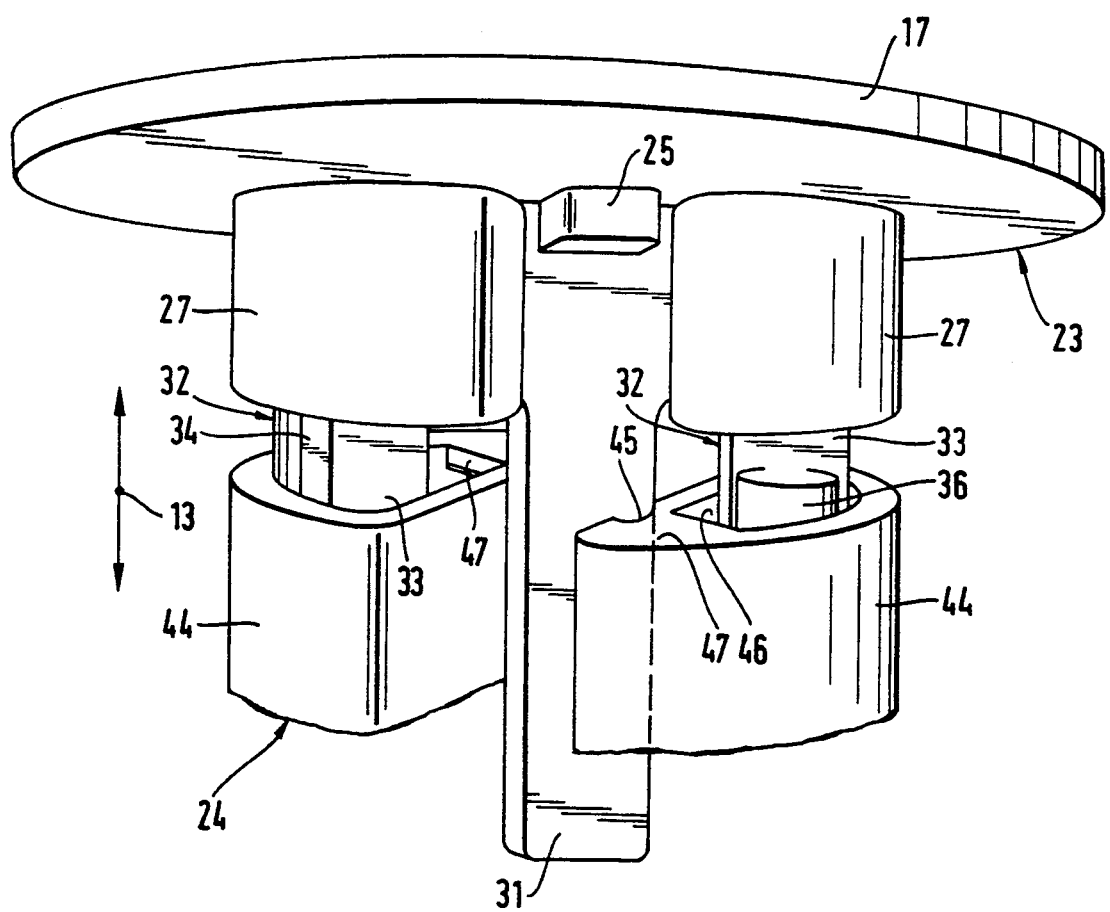
FIG. 18, a perspective view of the key half and lock half, shown in fragmentary form, during the insertion process.

4. The device is rotated in the left hand, so that the open bearing eye 14 opposite the disk 17 of the lock half 24 comes to rest at the top. As the last operation, the key half 23 is inserted into the lock half 24 and thus onto the device. FIGS. 16, 17 and 18 show the insertion process of the two half shafts into one another, in other words not showing the housing 1. Prior to the insertion, the disk 17 of the key half 23 is positioned in such a way that the marking 21 on the outside of the disk 17 of the key half 23 is positioned such that it is located along with the corresponding marking 21 on the outside of the housing on a straight line extending in the transverse parting line direction 18. The key half 23 is inserted into the housing 1 as shown in FIG. 16 and with its rails 32, as shown in FIG. 17, engages the insides of the hollow cross sections 43 of the track guides 44. In positioning the key half 23, care should be taken that the strip 31, projecting from the disk 17 of the key half 23, be disposed facing the strip 31 projecting from the disk 17 of the lock half 24. This is why the guide groove 45 and the support rib 38 are provided. As shown in FIG. 17, the support rib 38 rests with its narrow side protruding from the support leg 33 on the narrow side of the locking hook 47. By means of this contact of the support rib 38 on the locking hook 47, the strip 31 is swiveled into the guide groove 45. By means of the strip 31 sliding in the guide groove 45 in the axial direction 13 and by means of the support rib 38 sliding along the narrow side of the locking hook 47 in the axial direction 13, the key half 23 is compulsorily guided such that it is not rotatable relative to the lock half 24.

Figure 14:
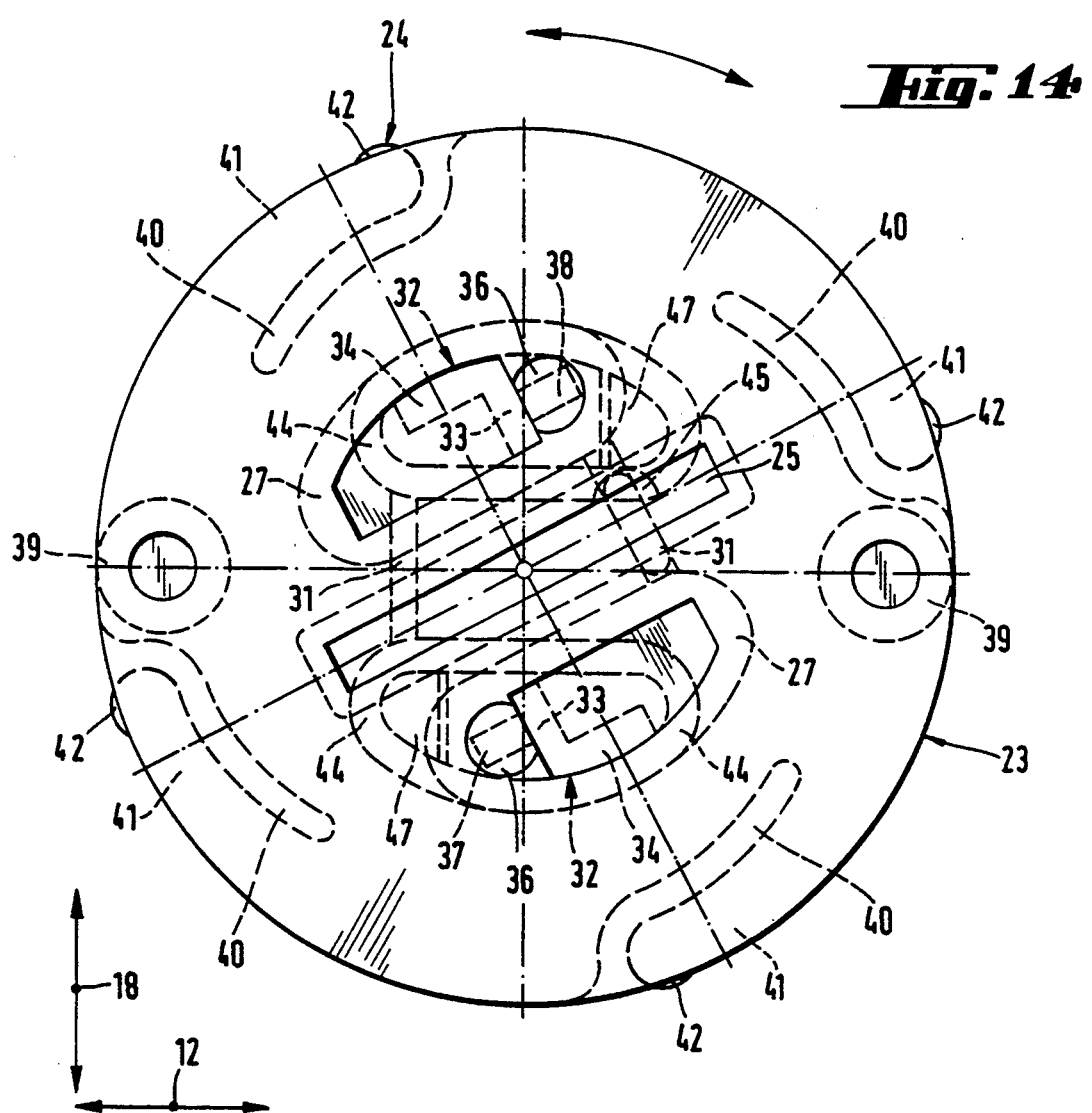
FIG. 14, a two-dimensional view of the two half shafts in the insertion position.
Figure 15:
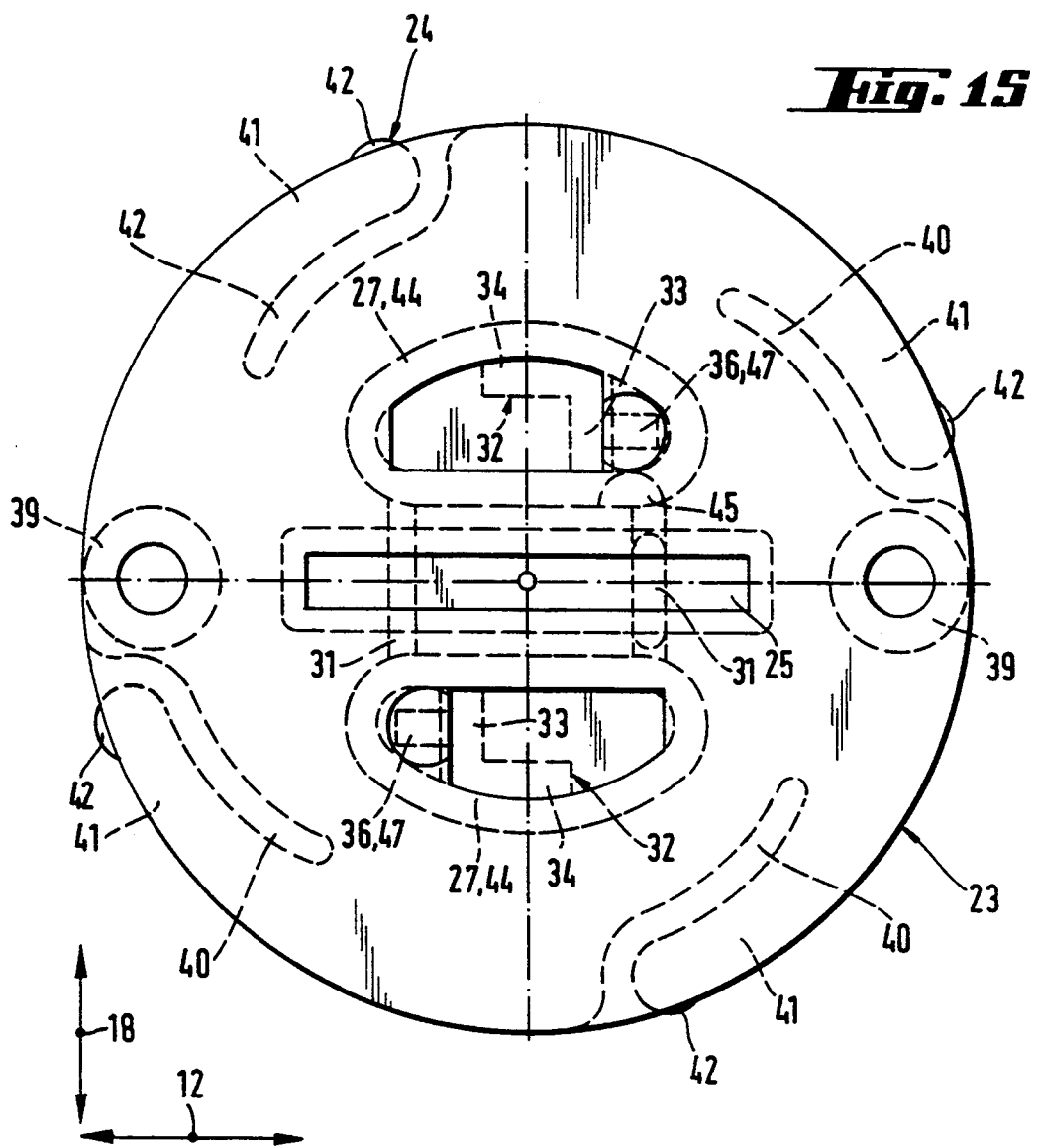
FIG. 15, a two-dimensional view of the two half shafts in the locking position.

5. The compulsory guidance by the strip 31 and the guide groove 45 on the one hand and by the support rib 38 and the locking hook 47 on the other is not controverted until the face ends of the spacer elements 27 rest on the face ends of the track guides 44. In this contacting condition, the lock half 24 must be either locked or firmly held, and the key half 23 must be rotated clockwise relative to the lock half 24 until the detent protrusions 36 have engaged the locking hooks 47 from behind as shown in FIG. 13b. The lock half 24 and the key half 23 must accordingly be rotated relative to one another out of their insertion position shown in FIG. 14 into their locking position shown in FIG. 15. The form-fitting engagement that is operative between the locking hooks 47 and the detent protrusions 36 not only locks the key half 23 and the lock half 24 together to make the coiling shaft 2, but also braces the half housing shells 3 together via the flange-like disk 17 to make the housing 1.

It will be understood that the above description of the present invention is susceptible to various modifications, changes and adaptations, and the same are intended to be comprehended within the meaning and range of equivalents of the appended claims.

What is claimed is:

1. A coiling device for cordage material, comprising:
a pair of housing shells which are structurally identical and which are joined together in mirror inversion to form a housing, each housing shell having a plane bottom which is pierced by a bearing eye, a curving wall which extends from the plane bottom, and a rim which is disposed approximately perpendicular to the bottom and which has an end face, the rim including a plurality of plane faces which are joined at edge regions, the housing shells being joined together with the end faces of their rims resting on one another, the housing shells further including means at the edge regions for aligning the housing shells when they are joined to form the housing;
a first half shaft; and
a second half shaft locked to the first half shaft to form a bearing shaft which is rotatably supported by the housing at the bearing eyes and which braces the housing,
wherein the housing shells have bores at some of their edge regions, and wherein the means for aligning the housing shells comprises centering pins which extend from one housing shell into the bores of the other housing shell.

2. The coiling device of claim 1, wherein the rim of each housing shell has twelve plane faces.

3. A coiling device for cordage material, comprising:
a pair of housing shells which are structurally identical and which are joined together in mirror inversion to form a housing, each housing shell having a plane bottom which is pierced by a bearing eye, a curving wall which extends from the plane bottom, and a rim which is disposed approximately perpendicular to the bottom and which has an end face, the rim including a plurality of plane faces which are joined at edge regions, the housing shells being joined together with the end faces of their rims resting on one another, the housing shells further including means at the edge regions for aligning the housing shells when they are joined to form the housing;
a first half shaft; and
a second half shaft locked to the first half shaft to form a bearing shaft which is rotatably supported by the housing at the bearing eyes and which braces the housing,
wherein each housing shell has entry and exit recesses which extend from its rim, wherein the entry recesses of the housing shells are aligned to form an entry opening having a predetermined size, and wherein the exit recesses of the housing shells are aligned to form an exit opening having a predetermined size that is different from the size of the entry opening.

4. A coiling device for cordage material, comprising:
a pair of housing shells which are joined together to form a housing, each housing shell having a circular bearing eye with a predetermined diameter;
a first half shaft having an outer end and having a flange-like disk at its outer end, the disk of the first half shaft having a diameter that is greater than the diameter of the bearing eyes; and
a second half shaft having an outer end and having a flange-like disk at its outer end, the disk of the second half shaft having a diameter that is greater than the diameter of the bearing eyes, the second half shaft being locked to the first half shaft to form a coiling shaft which braces the housing and which is rotatably supported by the housing, with the disks serving as axial bearings of the coiling shaft,
wherein the housing shells have offset regions around their bearing eyes and open track guides for the disks inside the offset regions, the open track guides having diameters that correspond to the diameters of the disks, and
wherein at least one of the disks is slit to form spring arms having free ends which press against the offset region of the respective housing shell to impede rotation of the coiling shaft.

5. A coiling device for cordage material, comprising:
a pair of housing shells which are joined together to form a housing, each housing shell having a circular bearing eye with a predetermined diameter;
a first half shaft having an outer end and having a flange-like disk at its outer end, the disk of the first half shaft having a diameter that is greater than the diameter of the bearing eyes; and
a second half shaft having an outer end and having a flange-like disk at its outer end, the disk of the second half shaft having a diameter that is greater than the diameter of the bearing eyes, the second half shaft being locked to the first half shaft to form a coiling shaft which braces the housing and which is rotatably supported by the housing, with the disks serving as axial bearings of the coiling shaft,
wherein the first half shaft is a lock half shaft having receiving elements, and wherein the second half shaft is a key half shaft having detent elements which are inserted into the receiving elements, the detent elements rotatably engaging the receiving elements after insertion to lock the half shafts together.

6. A coiling device for cordage material, comprising:
a pair of housing shells which are joined together to form a housing; and
a coiling shaft which is rotatably supported by the housing and which braces the housing, the coiling shaft having an axis, the coiling shaft including
a lock half shaft which includes a first disk, hollow track guides which extend from the first disk parallel to the axis, and locking hooks which are connected to the track guides and which protrude into the track guides transversely to the axis, and
a key half shaft which includes a second disk, rails which extend parallel to the axis and which are inserted into the track guides, and detent protrusions which are connected to the rails and which project transversely to the axis, the detent protrusions being positioned for rotation into engagement with the locking hooks to lock the half shafts together.

7. The coiling device of claim 6, wherein the rails of the key half shaft are two in number, wherein the rails are substantially L-shaped and have inner and outer sides, wherein the rails are disposed in point symmetry with one another and with their inner sides toward one another, wherein each rail includes a support leg with one of the detent protrusions molded into its outer side and a guide leg with a rounded guide face on its outer side, wherein the guide tracks of the lock half shaft are two in number and are disposed in point symmetry with one another, wherein the guide tracks are of flat-oval cross section and have flat sides and rounded sides, with the flat sides being oriented toward one another, wherein the rounded sides of the guide tracks have interior faces which slidably guide the guide legs, and wherein the guide tracks have open ends that are remote from the first disks, the locking hooks partially closing the open ends.

8. The coiling device of claim 7, wherein the rails have rail ends, wherein the key half shaft further comprises a pair of supports for the detent protrusions, each support being centrally disposed on a respective one of the support legs and being connected to a respective one of the detent protrusions, one of the supports being configured as a right triangle and the other support being configured as a support rib which extends from the respective detent protrusion to the rail end of the respective trail, wherein the flat sides of the guide tracks are spaced apart to form at least part of a fixation slot for the cordage material between them, and wherein one and only one of the guide tracks has a guide groove in its flat side.

9. The coiling device of claim 8, wherein the fixation slot extends for a predetermined length and has two sides, wherein the lock half shaft further comprises a first elongated strip projecting perpendicularly from the first disk and extending parallel to the axis, the first elongated strip closing the fixation slot at one of the slot sides for a portion of the length of the fixation slot, and wherein the key half shaft further comprises a second elongated strip projecting perpendicularly from the second disk and extending parallel to the axis, the second elongated strip being disposed at right angles to the guide legs of the rails and at a position for engagement with the guide groove.

10. A coiling device for cordage material, comprising:
a pair of housing shells which are joined together to form a housing;
a lock half shaft which includes a first disk and a pair of hollow, flat-oval guide tracks which extend from the first disk, the guide tracks having inner sides which are spaced apart to provide part of a fixation slot for the cordage material and having outer sides which are rounded; and
a key half shaft which is locked to the lock half shaft to form a coiling shaft which is rotatably supported by the housing and which braces the housing, the key half shaft including a second disk, a pair of flat-oval spacer elements having flat sides which are oriented toward one another and having outer sides which are rounded, the flat sides of the spacer elements being spaced apart to provide another part of the fixation slot, and rails which are connected to the spacer elements and which extend into the guide tracks, the track guides and the spacer elements having cross-sectional configurations that are identical so that the outer sides of the track guides and the spacer elements provide a generally cylindrical winding surface for the cordage material between the first and second disks.

11. The coiling device of claim 10, wherein the fixation slot extends for a predetermined length and has two sides, wherein the lock half shaft further comprises a first elongated strip which projects perpendicularly from the first disk, the first elongated strip closing one side of the fixation slot for a portion of the length of the fixation slot, and wherein the key half shaft further comprises a second elongated strip which projects perpendicularly from the second disk, the second elongated strip closing the other side of the fixation slot for a portion of the length of the fixation slot.

12. The coiling device of claim 11, wherein the first elongated strip has an end that is spaced apart from the second disk to provide a first through opening between the end of the first elongated strip and the second disk, wherein the second elongated strip has an end that is spaced apart from the first disk to provide a second through opening between the end of the second elongated strip and the first disk, and wherein the cordage material passes through the fixation slot via the first and second through openings.

13. The coiling device of claim 12, wherein the housing has blind bores to receive a handle bracket and visible markings as aids in assembling the coiling device, wherein the disks also have visible markings as aids in assembly, the key half shaft and the lock half shaft being disposed in a predetermined orientation with respect to the housing when the visual markings on the disks are disposed at predetermined locations with respect to the visible markings on the housing.

14. The coiling device of claim 13, wherein the disks have outer sides, one of the disks having a coin slot in its outer side and at least one of the disks having turning knobs projecting from its outer side.

15. The coiling device of claim 10, wherein the first and second housing shells are structurally identical and are mounted in mirror inversion to form the housing, each housing shell having a plane bottom and a curving wall extending from the bottom.

16. The coiling device of claim 15, wherein the bottoms of the housing shells are pierced by circular bearing eyes for rotatably supporting the coiling shaft.

17. The coiling device of claim 16, wherein the housing shells additionally have shell rims with end faces which rest on one another, the shell rims extending at approximately right angles to the bottoms of the housing shells and including a plurality of plane faces which are joined at edge regions, the housing shells further including centering means at the edge regions for aligning the housing shells when the are assembled to form the housing.

* * * * *